US012589843B2

(12) United States Patent
Kottke et al.

(10) Patent No.: US 12,589,843 B2
(45) Date of Patent: Mar. 31, 2026

(54) CONTROL DEVICE FOR CONTROLLING A WATERCRAFT, WATERCRAFT HAVING SUCH A CONTROL DEVICE, AND METHOD FOR CONTROLLING A WATERCRAFT

(71) Applicant: Rolls-Royce Solutions GmbH, Friedrichshafen (DE)

(72) Inventors: Thomas Kottke, Ehningen (DE); Rudolf Hoff, Weingarten (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 200 days.

(21) Appl. No.: 17/844,358

(22) Filed: Jun. 20, 2022

(65) Prior Publication Data

US 2022/0324544 A1 Oct. 13, 2022

Related U.S. Application Data

(63) Continuation of application No. PCT/EP2020/086552, filed on Dec. 16, 2020.

(30) Foreign Application Priority Data

Dec. 20, 2019 (DE) ...................... 10 2019 220 494.5

(51) Int. Cl.
| | |
|---|---|
| *B63B 79/40* | (2020.01) |
| *B63B 79/10* | (2020.01) |
| *G05D 1/00* | (2024.01) |
| *G08G 3/02* | (2006.01) |

(52) U.S. Cl.
CPC .............. *B63B 79/40* (2020.01); *B63B 79/10* (2020.01); *G05D 1/0206* (2013.01); *G08G 3/02* (2013.01)

(58) Field of Classification Search
CPC .... G05D 1/0206; G05D 1/0208; B63B 79/10; B63B 79/40; G08G 3/02
See application file for complete search history.

(56) References Cited

U.S. PATENT DOCUMENTS

| | | | |
|---|---|---|---|
| 8,825,266 B2 | 9/2014 | Naderhirn et al. | |
| 8,857,357 B2 | 10/2014 | Flint et al. | |
| 11,691,703 B2 | 7/2023 | Grunewald Mayer et al. | |
| 2009/0079590 A1* | 3/2009 | Hiraoka .............. | A47L 15/0057 |
| | | | 340/984 |

(Continued)

FOREIGN PATENT DOCUMENTS

| | | |
|---|---|---|
| EP | 2 360 091 A1 | 8/2011 |
| KR | 10-1799216 B1 | 11/2017 |

OTHER PUBLICATIONS

International Search Report and the Written Opinion dated Apr. 16, 2021 for International Application No. PCT/ EP2020/086552 (11 pages).

*Primary Examiner* — Aaron L Troost
(74) *Attorney, Agent, or Firm* — TAYLOR & EDELSTEIN, PC

(57) ABSTRACT

A control device for controlling a watercraft includes a position detection module and a positioning module. The position detection module is configured to detect a current position of the watercraft. The positioning module is configured to determine a new position for the watercraft within a delimited region depending on at least one positioning parameter when the watercraft approaches a boundary of the delimited region to within a predetermined distance or a parameterizable distance.

12 Claims, 4 Drawing Sheets

(56)                    References Cited

U.S. PATENT DOCUMENTS

| | | | |
|---|---|---|---|
| 2009/0271054 A1* | 10/2009 | Dokken | G01S 13/937 |
| | | | 701/21 |
| 2015/0142227 A1* | 5/2015 | Stephens | B63H 25/42 |
| | | | 701/21 |
| 2017/0365175 A1 | 12/2017 | Harnett | |
| 2019/0047675 A1* | 2/2019 | Clark | G05D 1/0208 |
| 2019/0084662 A1* | 3/2019 | Wong | B63H 25/04 |

* cited by examiner

CONTROL DEVICE FOR CONTROLLING A WATERCRAFT, WATERCRAFT HAVING SUCH A CONTROL DEVICE, AND METHOD FOR CONTROLLING A WATERCRAFT

CROSS REFERENCE TO RELATED APPLICATIONS

This is a continuation of PCT application no. PCT/EP2020/086552, entitled "CONTROL DEVICE FOR CONTROLLING A WATERCRAFT, WATERCRAFT HAVING SUCH A CONTROL DEVICE, METHOD FOR CONTROLLING A WATERCRAFT", filed Dec. 16, 2020, which is incorporated herein by reference. PCT application no. PCT/EP2020/086552 claims priority to German patent application no. 10 2019 220 494.5, filed Dec. 20, 2019, which is incorporated herein by reference.

BACKGROUND OF THE INVENTION

1. Field of the Invention

The present invention relates to a control device for controlling a watercraft, watercraft having such a control device, and method for controlling a watercraft.

2. Description of the Related Art

In the course of the ever increasing focus on environmental protection, zones are increasingly identified—especially in bays—where watercraft are no longer allowed to anchor, particularly to avoid damage to the bottom or seabed, as well as for reasons of animal and plant protection, especially to protect corals. In some instances, entire bays are affected by such anchoring prohibitions. In order to be able to stay in such no-anchor zones in spite of this, a watercraft must be permanently retained in a certain position by its way of propulsion. This significantly increases the energy consumption of such watercraft. On the one hand, this is disadvantageous for cost reasons, and on the other hand it is again disadvantageous for environmental reasons—especially with regard to climate protection. It is also generally desirable to be able to limit a watercraft in its freedom of movement, in particular to control its position without anchoring and at the same time in a cost-effective and energy-efficient manner.

What is needed in the art is a control device for controlling a watercraft, a watercraft having such a control device, and a method for controlling a watercraft, wherein the aforementioned disadvantages are at least reduced, optionally avoided.

SUMMARY OF THE INVENTION

The present invention provides a control device, which is designed for controlling a watercraft. The control device includes a position detection module designed to detect a current position of the watercraft. The control device moreover includes a positioning module that is designed to determine a new, in particular a second position for the watercraft within the delimited region depending on at least one positioning parameter when the watercraft—in particular coming from a first position—approaches a boundary of a delimited region to within a predetermined or parameterizable distance. The second position is therein optionally different from the first position. In an advantageous manner, the control device optionally enables a movement—in particular without propulsion—of the watercraft within the delimited region and at the same time ensures that the watercraft does not leave the delimited region, in particular by determining, optionally calculating, the new position, in particular as the second position, for the watercraft when the watercraft approaches a boundary of the delimited region up to the predetermined or parameterizable distance. The control device can thus ensure that the watercraft is held effectively inside the delimited region. By allowing a repositioning movement of the watercraft, a drive of the watercraft needs to be controlled as little as possible to keep the watercraft in the delimited region.

The selection of the new position of the watercraft inside the delimited region occurs advantageously in such a way, that in particular no permanent control or activation of the drive is required to retain the watercraft in the delimited region. Instead—in particular optionally on the basis of at least one specified criterion as the at least one positioning parameter, in particular emission reduction, noise reduction, cost efficiency or energy efficiency—the drive has to be actuated ideally only rarely and/or as briefly as possible, while at the same time the watercraft does not leave the delimited region. With the assistance of the herein proposed control device, the watercraft can safely stay also in those regions where it is not permitted to drop anchor, avoiding in particular the high costs and high emissions associated with a precisely specified holding of a precisely defined position.

With the assistance of the control device it is advantageously also possible to hold the watercraft in a resting area defined as the delimited region, for which an anchor chain of the watercraft is too short.

According to an optional design, the control device is an internal control device which is arranged in particular, to be used in a watercraft for controlling the watercraft. The control device is optionally designed to issue control commands, on the basis of which the watercraft is controlled when the control demands are carried out in the watercraft. The control device optionally has an interface designed for this purpose to connect with the watercraft.

According to another design, the control device is designed as an external control device, wherein such an external control device can be designed in particular as a central command, in particular a server, or as a decentralized computing device, in particular as a cloud. The control device designed as an external control device is optionally operatively connected to an internal control device of a watercraft, in particular in such a way that data from the external control device can be transferred to the internal control device. In particular, the new position determined by the external control device is transferable to the internal control device. The external control device is optionally designed to be operatively connected to the internal control device for a bidirectional data exchange, so that data can also be transmitted from the internal control device of the watercraft to the external control device, for example the current position of the watercraft.

The position detection module is designed optionally for a satellite controlled position detection, especially optionally for a satellite controlled navigation.

The distance to which the watercraft may approach the boundary of the delimited region—until the new position is determined—is predetermined in one design. The distance may herein be specified internally in the control device or from the outside, for example by a user or via an external control device.

According to another optional arrangement, the distance is parameterizable. It is then advantageously possible to change the distance according to requirement, in particular to adjust it.

The distance can in particular also be zero or selected to be zero. In this case, approaching the boundary of the limited region to the distance defined as zero means that the watercraft reaches the boundary of the delimited region.

The delimited region is in particular a region which is smaller than an expanse of water that is navigable by a watercraft, but larger than the watercraft itself. The delimited region can in particular be an area, the size of which corresponds to at least twice, optionally not exceeding fifty times, optionally not exceeding forty times, optionally not exceeding thirty times, optionally not exceeding twenty times, optionally not exceeding ten times, optionally not exceeding five times the size of the effective area of the watercraft, projected onto the water surface. The delimited region may, however, also be larger. The delimited region is in particular separated by at least one boundary or by a plurality of boundaries from at least one exclusion zone into which the watercraft may not enter or in which the watercraft may not stay. The watercraft may be present inside the boundary or the boundaries of the delimited region but may not cross into the at least one exclusion zone.

In particular, the delimited region is designed to be contiguous in such a way that the watercraft can reach all areas within the delimited region without having to pass through an exclusion zone. It is possible that the delimited region has no gaps. It is, however, also possible that prohibited areas exist within the delimited region, whereby such a prohibited area is in particular an exclusion zone that is enclosed by the delimited region, quasi in the manner of an enclave.

Such an exclusion zone can in particular also be defined by a water depth which is less than a specified minimum depth. In particular, a minimum water depth—that is a minimum distance between the keel of the watercraft and the bottom of a water body—is optionally defined which must be observed. The delimited region ends where the water depth is less than the predefined minimum distance or the minimum water depth. Such an exclusion zone, which is also referred to as a shallow area, can be predefined, but it can also be determined dynamically, in particular in real time, especially with the aid of a depth measuring device, in particular an echo sounder.

An exclusion zone is therefore understood to be in particular an area in which the watercraft is not allowed to be or into which it is not allowed to enter coming from the delimited region. In particular, the watercraft may not cross a boundary of the delimited region into the exclusion zone, which is also referred to below as a boundary violation. Such an exclusion zone may be located outside the delimited region but may also be located as a prohibited area within the delimited region and may in particular be enclosed by the delimited region. Such a prohibited area may include for example at least a shallow area, a coral settlement, or another condition which would be potentially dangerous for the watercraft or which, or vice versa, for which the watercraft would pose a danger. Such an exclusion zone may however also be defined by the position of another watercraft, wherein a collision with the other watercraft must be avoided.

As already stated, the wording that the watercraft may stay in the delimited region means, in particular, that the watercraft may not leave the delimited region, and wherein in particular, boundaries of the delimited region may not be crossed by the watercraft.

The control device is designed, in particular to virtually predefine, or receive, or to maintain the delimited region in a predefined manner. Accordingly, the boundaries of the delimited region are also virtual boundaries. In particular, the delimited region is defined in a control program, in particular a computer-implemented control program or control software for the control of the watercraft.

The fact that the new position is determined optionally means that the new position is computed.

The new, second position is optionally not specifically determined or computed differently from the first position. In particular, the first position is not considered in the determination of the second position. Rather, according to the procedure proposed here, the second position could be identical to the first position at most only purely coincidentally, which has such a low probability that as a result the second position will always be different from the first position.

The fact that the watercraft comes from a first position means that the watercraft is initially positioned at the first position and then moves away from this first position, in particular departs, and thus approaches the boundary of the delimited region.

The first position can herein be in particular a previously determined new or second position, which was previously determined for the watercraft by the positioning module.

Accordingly, the determined new position can then be a third position for the watercraft, and so on. The herein described procedure can thus be repeated multiple times by the control device, in particular can continuously be iterated, wherein always following the second execution of these steps the first position is a previously determined second position, and wherein the second position is a determined new, for example third position.

According to a further development of the invention it is provided that the position detection module is designed to repetitively detect the current position of the watercraft. Advantageously, the current position of the watercraft can be determined in this way, in particular permanently, and it can thus be determined whether the watercraft is approaching a boundary of the delimited region.

The control device is in particular designed to repetitively detect the current position of the watercraft with the assistance of the position detection module, and to repeatedly, in particular permanently, check with the assistance of the positioning module whether the watercraft is approaching a boundary of the delimited region up to the predetermined or parameterizable distance; and in this case to always determine the new position for the watercraft, in particular as the second position. The watercraft is thus kept permanently within the delimited region with the aid of the control device, meaning that its freedom of movement is effectively restricted to the delimited region, since a new position for the watercraft is constantly determined when it approaches a boundary of the delimited region up to the predetermined or parameterizable distance.

According to a further development of the present invention it is provided, that the positioning module is designed to generate control commands, based on which the watercraft is moved into the new position, when the control commands are carried out in the watercraft. In this way, the control device—in interaction with the watercraft, in particular in interaction with the drive of the watercraft—is able to reposition the watercraft in the new location and thus ultimately keep it within the delimited region.

According to a further development of the present invention, it is provided that the at least one positioning parameter is selected from a group consisting of a repositioning parameter, a size of the watercraft, an area expanse of the delimited region, a point in time at which the watercraft will leave the delimited region as intended, an another position of at least one other watercraft in the delimited region, and a movement, in particular another relocation parameter, of the at least one other watercraft. Each of these parameters can be relevant for determining the new position, in particular in such a way that the watercraft can be kept in the delimited region with minimum intervention in the drive and thus in particular in an energy- and cost-efficient manner, with low noise emissions and low pollutant emissions.

A repositioning parameter is understood in particular as a parameter that is associated with a repositioning of the watercraft within the delimited region, in particular without propulsion, whereby it is especially suitable for describing the repositioning of the watercraft within the delimited region.

The consideration of a repositioning parameter allows in particular an alignment of the new position with the actual repositioning of the watercraft inside the delimited region, so that in particular a time span that elapses until the next approach to the exclusion zone can be set to be as long as possible, specifically maximized.

The movement of the watercraft in the delimited region and in particular the approach to an exclusion zone occurs typically by way of external forces acting upon the watercraft, in particular due to wind and/or water currents. Taking into account the at least one repositioning parameter allows for such influences to be included in the consideration and consequently to find an especially favorable new position for the watercraft. In particular, at least one repositioning parameter of the non-powered watercraft in the delimited region is considered.

The repositioning parameter is optionally selected from a group consisting of a drift speed of the watercraft, an angular speed of the watercraft, a drift acceleration of the watercraft, and an angular acceleration of the watercraft.

In particular, via one of the parameters—drift speed, angular speed, drift acceleration and angular acceleration—flow conditions and/or wind conditions in the delimited region can be measured very precisely and taken into consideration.

As a drift speed of the watercraft a vectorial drift speed is optionally measured, that is a quantity consisting of a magnitude and a direction. The drift acceleration is optionally a time derivative of the drift speed.

An angular speed of the watercraft is understood in particular to be a speed with which the watercraft rotates around a vertical axis progressing through its center of gravity. If the watercraft rotates with the drive off in the delimited region, a rotation or rotational motion is typically superimposed on a drift motion, especially since wind and/or currents act asymmetrically on the watercraft. The angular acceleration is optionally a time derivative of the angular speed.

In particular, in the determination of the new position, a prioritization occurs of various repositioning paths for the watercraft, with values for the at least one repositioning parameter along these repositioning paths. By this way, the new position can be optimally determined.

The size of the watercraft is understood, in particular, to be its effective area projected onto the water surface. This can be particularly relevant for the determination of the new position inside the delimited region and/or for the assessment of the freedom of movement of the watercraft in the delimited region.

The area expanse of the delimited region is in particular an area or surface area over which the delimited region extends, or respectively which the delimited region has. This measure is also relevant—possibly in particular in relation to the size of the watercraft—for the question of freedom of movement of the watercraft in the delimited region.

The time at which the watercraft will leave the delimited region as intended is advantageously relevant insofar as the new position can be determined advantageously at a lesser distance from the current position of the watercraft if it is known that the watercraft will leave the delimited region as intended at a certain time in the future, in which case the new position is advantageously determined in such a way that the watercraft—in particular in the case of non-driven repositioning—does not leave the delimited region until this future point in time. Further repositioning, in particular at a greater distance from a boundary of the delimited region, is then not required, which advantageously saves energy and costs, and reduces noise and pollutant emissions. The watercraft can leave the delimited region as intended, for example, because it begins or continues an intended travel route, for example, it leaves an anchorage prohibition zone, in particular a bay, or the like as scheduled.

Taking into account the other position and/or movement of at least one other watercraft in the delimited region when determining the new position can, in particular, advantageously help to avoid a collision with the other watercraft.

Another watercraft is in particular a watercraft which is not identical to the watercraft, particularly the controlled or positioned watercraft considered within the scope of the present teaching. If the other position and/or the movement of the at least one other watercraft is/are already taken into account when determining the new position, this also has the advantage that evasive movements to avoid a collision with the other watercraft, for which the drive of the watercraft would have to be activated, can be avoided as far as possible, or their number can at least be reduced. This in turn leads to a reduction in energy consumption, emissions and noise emitted by the watercraft.

The other position and/or the movement of at least one other watercraft is optionally determined by distance measurement, in particular by way of a radar system, a lidar system and/or another suitable system for distance measurement. Alternatively or in addition, it is possible that the other position and/or movement of at least one other watercraft is obtained as information from the other watercraft, in particular via ship positioning systems of the watercraft on the one hand and the other watercraft on the other hand, which optionally exchange data with each other.

If the other watercraft is anchored, its position can be assumed as a circle around the anchor point. In particular, a collision with the other watercraft can be avoided in a an especially simple manner by defining the circle—including its surface area—as a new exclusion zone inside the delimited region for the watercraft.

An especially simple way to take into consideration the other position and/or movement of the at least one other watercraft consists also in that the delimited region for the watercraft is reduced, in particular excluding a rest area of the other watercraft as an exclusion zone from the delimited region.

According to a further development of the invention it is provided that the control device is designed to detect the at least one repositioning parameter in a repetitive and location-dependent manner. This facilitates in particular advantageous knowledge and also consideration of location-dependent repositioning conditions for the watercraft inside the delimited region.

A further development of the invention provides that the control device has a mapping module which is designed to assign the at least one repositioning parameter to a location inside the delimited region, where the at least one repositioning parameter is detected by the control device. In this way, mapping of the at least one repositioning parameter and thus of the repositioning conditions in the delimited region can occur, which in turn can be used in particular for a most suitable determination of the new location.

A further development of the invention provides that the control device has a communication module which is designed to receive at least one information from the other watercraft. The control device can thus learn from the other watercraft and can in particular use data that was not collected by the control device itself. Thus, the data base for the control device is advantageously expanded. The at least one information is optionally selected from a group consisting of another position of the other watercraft and another relocation parameter of the other watercraft. In particular, this information not only facilitates considering the other watercraft, even when determining the new position, but at the same time also detection of repositioning conditions in the delimited region at locations where the watercraft itself is not located, but where the other watercraft is. The repositioning conditions inside the delimited region can thus be advantageously detected and considered, even in locations remote from the watercraft.

The other relocation parameter is therein optionally selected from a group consisting of a drift speed of the other watercraft, an angular speed of the other watercraft, a drift acceleration of the other watercraft, and an angular acceleration of the other watercraft.

The communication module is optionally designed, to communicate bidirectionally with the other watercraft, and in particular to also transmit an information to the other watercraft.

In particular, it is optionally provided that the control device and the at least one other watercraft exchange at least one communication.

The other repositioning parameter and/or the other position can be linked within the scope of a sensor data fusion with results of a distance measurement, and thus increase the accuracy of the position determination for the other watercraft in the control device.

As other repositioning parameters of the other watercraft, drift speeds recorded at different locations in the delimited region are optionally transmitted, in particular including the drift directions, that is, as vectorial quantities, drift accelerations, angular speeds and/or angular accelerations. Thus, the conditions in different areas of the delimited region can be detected more quickly than if only the data detected by the watercraft itself is used.

Overall, therefore, the data obtained from the other watercraft is used to learn how the other watercraft behaves in the delimited region. This can then be considered in the determination of the new position, taking into account in particular where the watercraft are likely to meet.

According to a further development of the invention it is provided that the mapping module is designed to include the other relocation parameter received from the at least one other watercraft into the mapping of the at least one relocation parameter. This facilitates faster advance of mapping than would be possible with only data of the watercraft itself, so that complete information regarding the conditions in the delimited region—specifically in regard to current and wind conditions—are available more quickly.

The control device is designed in particular, to carry out a method according to the invention or a method according to one of the embodiments described below.

The present invention also provides a watercraft which includes a control device according to the invention, or a control device according to one of the previously described design examples.

In connections with the watercraft advantages result which were already discussed in connection with the control device.

A watercraft is understood to be in particular a vehicle which is intended for movement on or in the water. In particular, the watercraft is understood to be a vehicle which has its own drive, in other words, it is self-propelled. In particular, a watercraft is understood to be a ship, a boat, or a raft.

The present invention also provides a method for controlling a watercraft, wherein a delimited region is specified or will be specified in which the watercraft may be present, wherein a current position of the watercraft is detected, optionally repeatedly, wherein, when the watercraft—in particular coming from a first position—approaches a boundary of the delimited region up to a predetermined or parameterizable distance, a new, in particular second position for the watercraft within the delimited region is determined depending on at least one positioning parameter, the second position optionally being different from the first position or being selected differently. In connection with the method, the advantages arise in particular, which have already been explained in connection with the control device.

The method is in particular characterized by at least one step of the method that has been explicitly explained or implied in connection with the control device and the function thereof.

The method is in particular a method to hold a watercraft in the delimited region.

The watercraft is optionally positioned in the new position inside the delimited region in such a way, that a drive of the watercraft needs to be activated as little as possible in order to hold the watercraft in the delimited region.

The fact that the drive needs to be activated as little as possible means in particular that the drive is activated as rarely and/or as briefly as possible. Activation over the briefest possible duration means in particular taking as brief a time as possible for the activation of the drive. An infrequent as possible activation means in particular that the number and/or frequency of activation of the drive is kept as low as possible, in particular minimized. The number is in particular an absolute number of activations of the drive in the delimited region. The frequency is in particular a temporal density, that is, number density of the activations of the drive.

To carry out the method, the following steps are optionally performed:

The current position of the watercraft is a) repeatedly detected, wherein b) the new position for the watercraft is determined, when the watercraft approaches the exclusion zone to within a predetermined or parameterizable distance and wherein c) the watercraft is repositioned to the new position. According to step b) it is provided that the new position is determined in such a way that a number of necessary relocations of the watercraft in the delimited region becomes as small as possible. Thus, it is advantageously achieved that the watercraft does not enter into exclusion zones or prohibited areas, wherein however, at the same time a permanent positioning of the watercraft in a firmly projected position is avoided. Rather, the number of new positionings is advantageously reduced, so that the performance associated with the avoidance of the exclusion zones, as well as the energy consumption of the watercraft is significantly reduced.

In particular, the current position of the watercraft inside the delimited region is captured in step a).

The fact that the current position of the watercraft is repeatedly detected in step a) means in particular that the position of the watercraft is detected several times over a period of time during implementation of the method, optionally regularly, optionally continuously, or in discrete time steps, over time and during the execution of the method. Thus, in particular, permanent monitoring of the instantaneous position of the watercraft takes place.

In step b) the watercraft approaches the exclusion zone in particular without propulsion, in particular by drifting in the delimited region.

In step c) the watercraft is repositioned to the new position, in particular by way of its own drive.

The watercraft remains the delimited region in particular without being anchored, in other words, no anchor was thrown. The delimited region is in particular in a zone where anchors are prohibited.

The fact that the new position is determined in such a way that a number of necessary relocations of the watercraft in the delimited region becomes as small as possible means in particular that the new position is determined in such a way that a time until a next approach to an exclusion zone becomes as long as possible—optionally to a maximum—or that alternatively no more relocations are necessary until the watercraft leaves the delimited region as intended. If the time until the next approach to an exclusion zone is as long as possible, repositioning and thus activation of the drive of the watercraft is required as infrequently as possible at the same time, resulting in a significant reduction in the costs and emissions associated with the positioning procedure. It can advantageously be taken into account when the watercraft leaves the restricted area as intended, for example because it starts or continues an intended route, leaves an anchor prohibition zone, in particular a bay, or the like. The new position can then be advantageously selected so that the relocation thereto is not so far, saving costs and emissions, with the watercraft leaving the delimited region as intended anyway until the next approach to the exclusion zone.

The time until a next approach to an exclusion zone can be made as long as possible in a particularly simple way by making a repositioning path from the new position to the exclusion zone as long as possible, in particular by maximizing it.

An advantageous improvement of this simple arrangement provides, that current and/or drift speeds are taken into account, in particular along different paths or routes, wherein in particular different paths or routes for the watercraft with their prevailing current and/or drift speeds are weighted.

The new position is optionally determined in such a way, that the number of necessary relocations of the watercraft in the delimited region becomes minimal. This means in particular, that the time to the next approach to an exclusion zone is then at a maximum.

A necessary relocation is herein in particular a relocation of the watercraft, which is necessary or becomes necessary in order to avoid that the watercraft commits a boundary violation, in particular to avoid that the watercraft enters an exclusion zone.

Steps a) to c) are optionally carried out repeatedly, in particular continuously or iteratively, to keep the watercraft permanently or for a predetermined time in the delimited region. The herein suggested method thus replaces in particular anchoring of the watercraft.

According to a further development of the invention it is provided that as the at least one positioning parameter, at least one repositioning parameter of the watercraft is determined in that, starting from the first position of the watercraft, a time and/or a change in an angular position of the watercraft until approaching a boundary of the delimited region or until reaching the boundary are detected. In particular, via the detection of the position and/or orientation of the watercraft, very precise information about the drift and/or angular speed as well as the corresponding accelerations of the watercraft can thus be obtained.

According to a further development of the invention, it is provided that the at least one positioning parameter is selected from a group consisting of a repositioning parameter, a size of the watercraft, an area expanse of the delimited region, a point in time at which the watercraft will leave the delimited region as intended, another position of at least one other watercraft in the delimited region, and a movement, in particular another repositioning parameter, of the at least one other watercraft.

According to a further development of the invention, it is provided that the at least one repositioning parameter is optionally selected from a group consisting of a drift speed of the watercraft, an angular speed of the watercraft, a drift acceleration of the watercraft, and an angular acceleration of the watercraft.

Optionally, the at least one repositioning parameter of the watercraft, in particular the non-driven watercraft, is recorded multiple times during repetitions of steps a) through c), wherein a mapping of the at least one repositioning parameter is performed in the delimited region and used to determine the new position in step b). This is based on the idea that the new position in each repetition of the process steps a) to c) will typically not be the same as in the previous passes. The watercraft thus gradually sweeps over the delimited region during a plurality of movements between different new positions and approaches to exclusion zones, whereby the water flow conditions in the delimited region can be measured and stored in the form of the mapping. These findings can then be used to determine with increasing precision the new position in step b) in such a way that in fact the number of necessary relocations of the watercraft becomes as few as possible, in particular minimal.

It is in particular provided that the watercraft remains non-driven in the delimited region, except for the relocation to the new position. In particular, the watercraft is held in the delimited region with the drive turned off, or with the drive in idling mode. The movement of the watercraft from the first position or the new position until the approach to the exclusion zone occurs in particular due to flow and/or water conditions in the delimited region.

The movement of the at least one other watercraft is taken into account in particular as another repositioning parameter. The other repositioning parameter is optionally a drift speed of the other watercraft, a drift acceleration of the other watercraft, an angular speed of the other watercraft, and/or an angular acceleration of the other watercraft.

Optionally, the drift speed of the other watercraft is compared with the drift speed of the watercraft, and the watercraft is positioned relative to the other watercraft depending on a result from this comparison. If it turns out, for example, that the other watercraft drifts faster than the watercraft,—viewed in drift direction—the watercraft is optionally positioned behind the other watercraft in order to avoid a collision, o evasive movements associated with collision avoidance can be taken. Due to the differences in drift speed, the difference between the watercraft and the other watercraft tends to increase during drifting. Conversely, the watercraft—viewed in drift direction—is optionally positioned before the other watercraft, if the watercraft has a higher drift speed than the other watercraft. Different drift speeds can arise in particular based on different target surfaces of the different watercrafts for water currents and/or wind.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
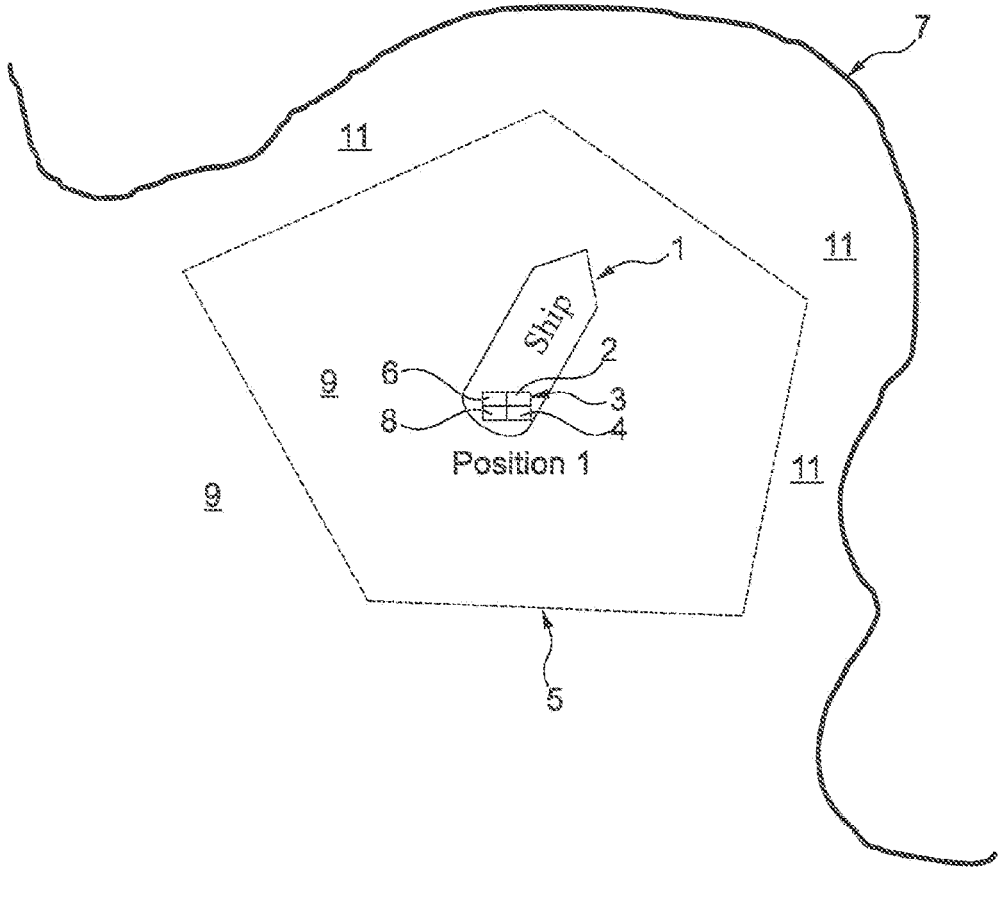
FIG. 1 is a schematic representation of one design example of a watercraft with a design example of a control device, and a first step of an embodiment of a method for controlling the watercraft.

FIG. 1 shows a schematic representation of a design example of a watercraft 1, which in this case is in the embodiment of a ship. Watercraft 1 includes a design example of a control device 3, which is designed in particular to carry out a method described in more detail below.

Control device 3 includes a position detection module 2 which is designed, to detect a current position of watercraft 1. Control device 3 also includes a positioning module 4, which is designed to determine a new position, in particular as a second position for watercraft 1 within delimited region 5, depending on at least one positioning parameter, when watercraft 1 approaches a boundary of delimited region 5, in particular when coming from a first position and approaching said boundary to within a predetermined or parameterizable distance, the second position optionally being different from the first position.

Position detection module 2 is optionally designed to repeatedly detect the current position of watercraft 1.

Positioning module 4 is optionally designed to generate control commands, based on which watercraft 1 is moved to the new position when the control commands are executed in watercraft 1.

Figure 4:
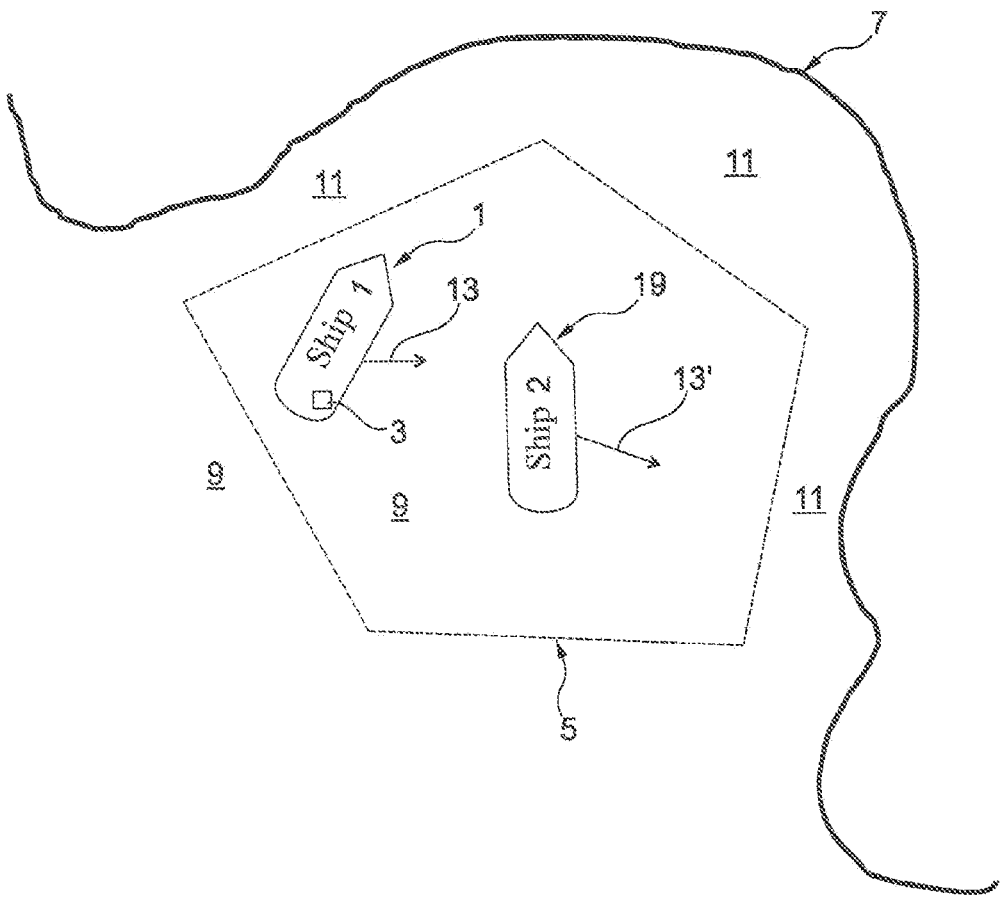
FIG. 4 is a schematic representation of a second embodiment of the method.

The at least one positioning parameter is selected from a group, consisting of a drift speed of watercraft 1, an angular speed of watercraft 1, a drift acceleration of watercraft 1, an angular acceleration of watercraft 1, collectively also referred to as repositioning parameters, a size of watercraft 1, an area expanse of delimited region 5, a time at which watercraft 1 will leave delimited region 5 as intended, another position of at least one other watercraft 19 shown in FIG. 4 in delimited region 5, and a movement of the at least one other watercraft 19.

Control device 3 is in particular designed to detect the at least one repositioning parameter, repetitively and location-dependent.

Control device 3 optionally includes a mapping module 6, which is designed to assign the at least one repositioning parameter to a location inside delimited region 5, where the at least one repositioning parameter is detected by control device 3.

In addition, control device 3 optionally includes a communication module 8, which is designed to receive at least one information from other watercraft 19, wherein the at least one information is optionally selected from a group, consisting of another position of other watercraft 19 and another repositioning parameter of other watercraft 19.

Within the scope of the method for controlling watercraft 1, delimited region 5 in which watercraft 1 may stay is in particular specified. The current position of watercraft 1 is detected—optionally repeatedly—wherein, when watercraft 1 approaches a boundary of delimited region 5 up to the predetermined or parameterizable distance, in particular when coming from the first position, the new, in particular second position for watercraft 1 within delimited region 5 is determined depending on at least one positioning parameter, the second position optionally being selected to be different from the first position.

Within the scope of the method, watercraft 1 is positioned in particular within delimited region 5 in such a way that a drive of watercraft 1 needs to be actuated as little as possible in order to keep watercraft 1 inside delimited region 5. Thus, watercraft 1 can advantageously be positioned in particular cost-efficiently, with low noise emissions, pollutant emissions, and in particular without anchoring.

Delimited region 5 is specified in particular virtually in control device 3 for watercraft 1.

In an optional embodiment the steps explained in more detail below are carried out for implementation of the method.

FIG. 1 shows in particular a first step of a first embodiment of a method for controlling, in particular positioning of watercraft 1.

A current position of watercraft 1 inside the delimited region is a) detected repeatedly, in particular regularly. Watercraft 1 is shown herein in a first position, referred to as "position 1", in particular a starting position, within delimited region 5.

In an optional embodiment, delimited region 5 is arranged within a bay 7 of a body of water 9. In particular, it is possible that delimited region 5 is arranged within an anchor prohibition zone in which watercraft 1 is not allowed to drop anchor. Starting from the first position in FIG. 1, watercraft 1 is optionally in delimited region 5 without propulsion, that is with the drive switched off or with the drive in idling mode.

A boundary of delimited region 5 is shown in FIG. 1 and in the following drawings, in particular as a dashed line. Outside the delimited region—divided by the dashed line— there is an exclusion zone 11 where watercraft 1 is not permitted and into which watercraft 1 is not allowed to enter.

Delimited region 5 is in particular smaller than the body of water 9, but larger, in particular much larger, than watercraft 1. Within the scope of the method explained in more detail below, watercraft 1 is thus not kept in a position narrowly limited by its own dimensions—possibly with tolerances—but it is only required that watercraft 1 remains within delimited region 5.

Figure 2:
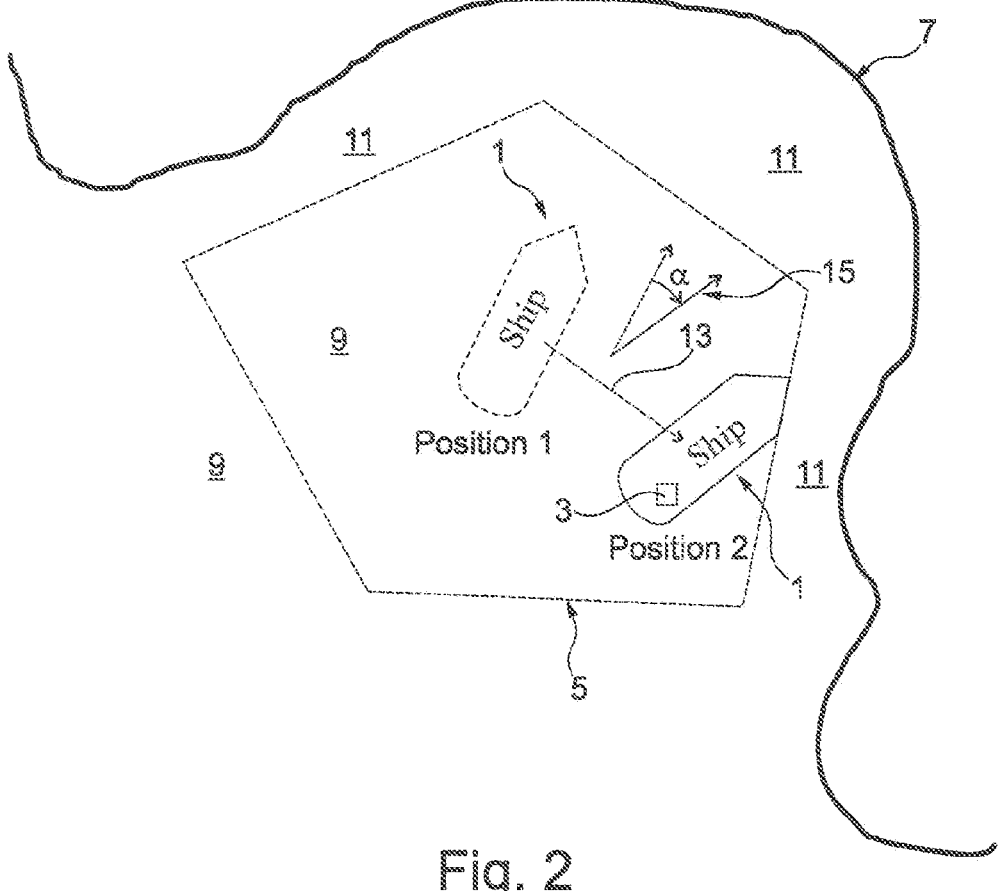
FIG. 2 is a schematic representation of a second step of the method.

FIG. 2 illustrates a second step of the first embodiment of the method.

Identical, and functionally identical elements have the same reference identifications, so that in this respect reference is always made to the previous identifications.

In past or future positions, watercraft 1 is always shown with dashed lines, but current positions are indicated in solid lines. Moreover, control unit 3 is always only shown in the respective current position of watercraft 1.

FIG. 2 shows that watercraft 1, which is arranged without propulsion in delimited region 5, moves from first position, position 1, to another position, referred to herein as "position 2". In doing so, watercraft 1 is moved in particular by currents as well as winds in delimited region 5. Watercraft 1 thereby approaches exclusion zone 11, and in particular in FIG. 2 already touches on the boundary of delimited region 5.

During this movement of watercraft 1, at least one relocation parameter for watercraft 1 is in particular determined, in which, starting from the first position, position 1, a time and/or a change in an angular position of watercraft 1 up to the approach to exclusion zone 11, in particular up to the other position, position 2, are detected. In particular, a drift speed 13—represented by a dashed arrow—as a vectorial quantity—as well as an angular speed 15 are detected here as repositioning parameters, optionally also a drift acceleration and/or an angular acceleration.

Figure 3:
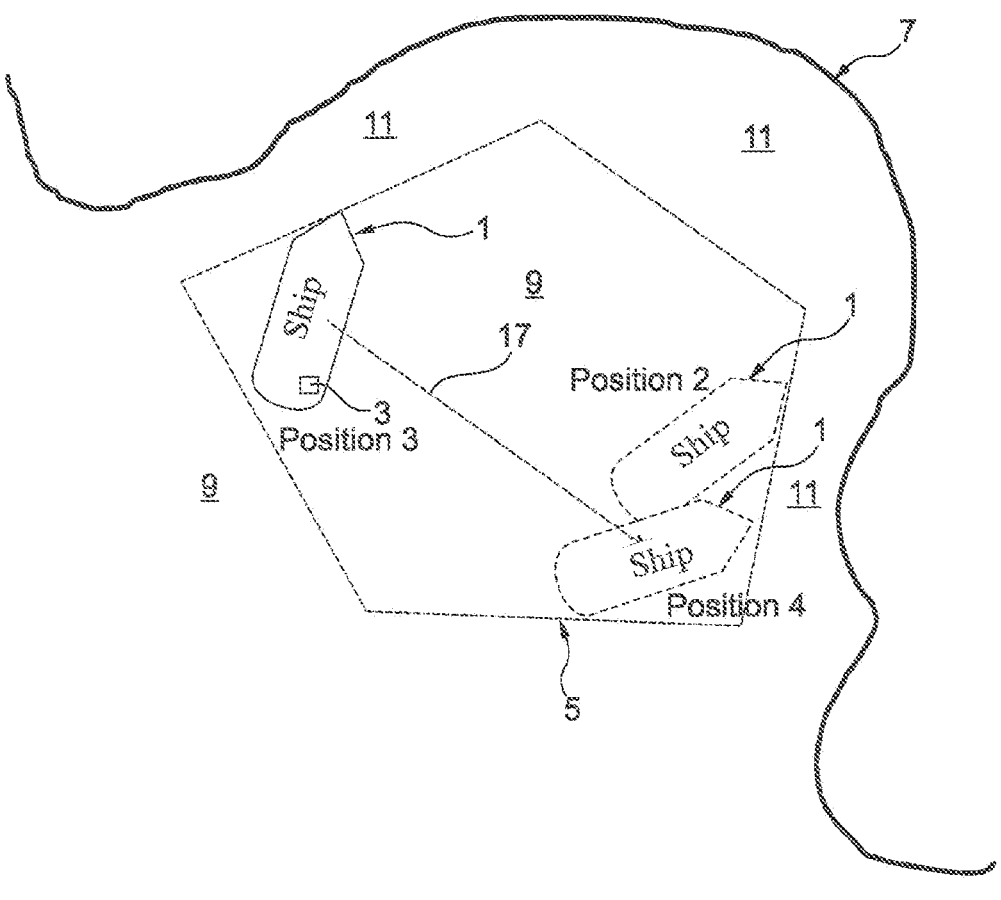
FIG. 3 is a schematic representation of a third step of the method.

FIG. 3 shows a third step of the embodiment of the method.

When watercraft 1 approaches exclusion zone 11—without propulsion—b) a new position is determined as a second position for watercraft 1, referred to as "position 3" in the third step shown here; the new position being determined in such a way that a number of necessary relocations of watercraft 1 in delimited region 5 become as few as possible. Watercraft 1 is then c) relocated to the new position, in particular driven there by its own drive. The result of this active relocation of watercraft 1 is shown in FIG. 3. Watercraft 1 is then located in its new position, position 3. In particular, this position 3 is determined in such a way that a repositioning vector 17 predicted in particular on the basis of the detected repositioning parameters—in particular drift speed 13 and angular speed 15—becomes as large as possible up to a predicted future position, "position 4", of watercraft 1 at which it again approaches exclusion zone 11. In particular, in this way, the time span that elapses until the next approach to exclusion zone 11 becomes as long as possible. In particular, it is calculated to which position watercraft 1 must be maneuvered so that predicted repositioning vector 17 within delimited region 5 becomes as long as possible before watercraft 1 again performs a boundary violation. If watercraft 1 is now at the new position, position 3, it can remain without active drive until the future position, position 4.

This procedure is optionally carried out repetitively or iteratively, so that as a result, watercraft 1 is kept within delimited region 5, whereby however engagement of the drive occurs infrequently. This saves costs, emissions, and avoids noise.

Moreover, watercraft 1 can stay in bay 7 without having to drop anchor; an anchoring prohibition that may exist can therefore be observed without any danger resulting therefrom, or watercraft 1 having to be held in a position essentially defined by its dimensions and which would be associated with high power and cost expenditure as well as high emissions and noise pollution.

As already discussed, in determining the new position the at least one repositioning parameter it is optionally taken into account, in particular drift speed 13 and/or wind velocity 15.

Optionally, the at least one repositioning parameter is detected multiple times during repetitions of steps a) to c), wherein mapping of the at least one repositioning parameter is performed on delimited region 5 and used for the determination of the respective new position in step b).

Except for the active repositioning of watercraft 1 in step c) to the respective new position, watercraft 1 is optionally operated without propulsion in delimited region 5, that is, in particular with the drive switched off, or with the drive in idling mode.

FIG. 4 is a schematic representation of a second embodiment of the method.

In this instance, another watercraft 19 is also arranged in addition to watercraft 1 in delimited region 5. Within the scope of the second embodiment of the method—in particular in addition to the steps and procedures described in connection with the first embodiment of the method—another position and/or a movement, in particular another repositioning parameter of the other watercraft 19 in delimited region 5, is herein taken into account when determining the second, new position for the watercraft 1. This other position and/or movement is optionally determined by distance measurement, in particular by way of radar, lidar, or another suitable system, or is received as information from other watercraft 19. The consideration of the other position and/or movement of other watercraft 19 during the repositioning of watercraft 1 makes it possible in an advantageous manner to avoid a collision between watercraft 1 and other watercraft 19, particularly optionally without additional intervention in the drive of watercraft 1.

Watercraft 1 and the at least one other watercraft 19 optionally exchange at least one piece of information, in particular selected from a group consisting of a current position and at least one repositioning parameter, especially optionally a vectorial drift speed. To this extent, drift speed 13 for watercraft 1 and another drift speed 13' for other watercraft 19 are shown in FIG. 4.

Watercraft 1 is especially optionally positioned depending on a comparison between drift speed 13 and other drift speed 13', in particular either in drift direction before other watercraft 19, or—as shown in FIG. 4—behind other watercraft 19.

The other repositioning parameters received from other watercraft 19 are optionally included into the mapping of the at least one repositioning parameter.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control system for controlling a watercraft, the control system comprising:

a drive; and a controller for controlling the watercraft, the controller being configured:

to receive a control signal providing a current position of the watercraft;

to determine a new position for the watercraft within a delimited region depending on at least one positioning parameter when the watercraft approaches a boundary of the delimited region to within a predetermined distance or a parameterizable distance, the drive being configured for repositioning the watercraft within the delimited region based on the new position, wherein, when active repositioning is commanded by the controller, the drive repositions the watercraft within the delimited region based on the new position;

to receive a control signal providing at least one information from at least one other watercraft in the delimited region, the at least one information being at least one repositioning parameter of the at least one other watercraft, the at least one repositioning parameter of the at least one other watercraft being at least one of a drift speed of the at least one other watercraft and a drift acceleration of the at least one other watercraft; and to determine the new position for the watercraft within the delimited region depending at least in part on the at least one repositioning parameter of the at least one other watercraft.

2. The control system according to claim 1, wherein the controller is configured to repeatedly receive a respective control signal providing the current position of the watercraft.

3. The control system according to claim 1, wherein the controller is configured to generate a plurality of control commands, based on which the watercraft is configured for being moved into the new position, when the plurality of control commands are carried out in the watercraft.

4. The control system according to claim 1, wherein the at least one positioning parameter is selected from a group consisting of: a drift speed of the watercraft; an angular speed of the watercraft; a drift acceleration of the watercraft; an angular acceleration of the watercraft; a size of the watercraft; an area expanse of the delimited region; a time at which the watercraft will leave the delimited region as intended; a position of the at least one other watercraft in the delimited region; and a movement of the at least one other watercraft.

5. The control system according to claim 4, wherein the at least one repositioning parameter of the watercraft selected from a group consisting of: the drift speed of the watercraft; the angular speed of the watercraft; the drift acceleration of the watercraft; and the angular acceleration of the watercraft in a repetitive and location-dependent manner.

6. The control system according to claim 5, wherein the controller is configured to assign the at least one repositioning parameter of the watercraft to a location inside the delimited region, where the at least one repositioning parameter of the watercraft is detected by the control system.

7. The control system according to claim 5, wherein the controller is configured to receive another information from the at least one other watercraft, wherein the other information is a position of the at least one other watercraft.

8. A watercraft, comprising:

a control system for controlling the watercraft, the control system comprising:

a drive; and a controller for controlling the watercraft, the controller being configured:

to receive a control signal providing a current position of the watercraft;

to determine a new position for the watercraft within a delimited region depending on at least one positioning parameter when the watercraft approaches a boundary of the delimited region to within a predetermined distance or a parameterizable distance, the drive being configured for repositioning the watercraft within the delimited region based on the new position, wherein, when active repositioning is commanded by the controller, the drive repositions the watercraft within the delimited region based on the new position;

to receive a control signal providing at least one information from at least one other watercraft in the delimited region, the at least one information being at least one repositioning parameter of the at least one other watercraft, the at least one repositioning parameter of the at least one other watercraft being at least one of a drift speed of the at least one other watercraft and a drift acceleration of the at least one other watercraft; and to determine the new position for the watercraft within the delimited region depending at least in part on the at least one repositioning parameter of the at least one other watercraft.

9. A method for controlling a watercraft, the method comprising the steps of:

specifying a delimited region in which the watercraft is configured for being present;

detecting a current position of the watercraft;

determining, when the watercraft approaches a boundary of the delimited region up to a predetermined distance or a parameterizable distance, a new position for the watercraft within the delimited region depending on at least one positioning parameter, the watercraft including a drive that is configured for repositioning the watercraft within the delimited region based on the new position;

repositioning, when active repositioning is commanded by the controller, the watercraft within the delimited region based on the new position using the drive; and receiving a control signal providing at least one information from at least one other watercraft in the delimited region, the at least one information being at least one repositioning parameter of the at least one other watercraft, the at least one repositioning parameter of the at least one other watercraft being at least one of a drift speed of the at least one other watercraft and a drift acceleration of the at least one other watercraft, the step of determining further including determining the new position for the watercraft within the delimited region depending at least in part on the at least one repositioning parameter of the at least one other watercraft.

10. The method according to claim 9, wherein, as the at least one positioning parameter, at least one repositioning parameter of the watercraft is determined in that, starting from a first position of the watercraft, at least one of a time and a change in an angular position of the watercraft until approaching a boundary of the delimited region or until reaching the boundary is or are detected, the step of detecting the current position of the watercraft occurring repeatedly.

11. The method according to claim 9, wherein the at least one positioning parameter is selected from a group consisting of: at least one repositioning parameter of the watercraft; a size of the watercraft; an area expanse of the delimited region; a point in time at which the watercraft will leave the delimited region as intended; a position of the at least one other watercraft in the delimited region; and a movement of the at least one other watercraft.

12. The method according to claim 11, wherein the at least one repositioning parameter of the watercraft is selected from a group consisting of: a drift speed of the watercraft; an angular speed of the watercraft; a drift acceleration of the watercraft; and an angular acceleration of the watercraft.

* * * * *